(12) United States Patent
Yang et al.

(10) Patent No.: US 12,097,089 B2
(45) Date of Patent: Sep. 24, 2024

(54) TRABECULAR POROUS TANTALUM DENTAL IMPLANT AND PREPARATION METHOD THEREOF

(71) Applicant: Shenzhen Dazhou Medical Technology Co., Ltd., Shenzhen (CN)

(72) Inventors: Jingzhou Yang, Shenzhen (CN); Jinghao Yang, Shenzhen (CN); Dachen Zhang, Shenzhen (CN); Shupei Zhang, Shenzhen (CN); Haishen Chen, Shenzhen (CN)

(73) Assignee: SHENZHEN DAZHOU MEDICAL TECHNOLOGY CO., LTD., Shenzhen (CN)

(*) Notice: Subject to any disclaimer, the term of this patent is extended or adjusted under 35 U.S.C. 154(b) by 380 days.

(21) Appl. No.: 17/238,419

(22) Filed: Apr. 23, 2021

(65) Prior Publication Data
US 2021/0330431 A1    Oct. 28, 2021

(30) Foreign Application Priority Data

Apr. 24, 2020  (CN) .......................... 202010331329.1

(51) Int. Cl.
*A61C 8/00* (2006.01)
*A61C 13/00* (2006.01)

(52) U.S. Cl.
CPC .......... *A61C 8/0051* (2013.01); *A61C 8/0012* (2013.01); *A61C 8/0059* (2013.01); *A61C 8/0068* (2013.01); *A61C 13/0019* (2013.01)

(58) Field of Classification Search
CPC ... A61C 8/0051; A61C 8/0012; A61C 8/0059; A61C 8/0068; A61C 13/0019; A61C 2008/0046
See application file for complete search history.

(56) References Cited

U.S. PATENT DOCUMENTS

| | | | |
|---|---|---|---|
| 8,684,734 B1* | 4/2014 | Lyren .................. | A61C 8/0024 433/173 |
| 2010/0003638 A1* | 1/2010 | Collins ................. | A61K 6/818 433/174 |

(Continued)

FOREIGN PATENT DOCUMENTS

WO    WO-2021091406 A1 *    5/2021    ........... A61C 8/0006

OTHER PUBLICATIONS

Jingzhou Yang et al., "Static Compressive Behavior and Material Failure Mechanism of Trabecular Tantalum Scaffolds Fabricated by Laser Powder Bed Fusion-based Additive Manufacturing", Int J Bioprint, 2021, vol. 8, Issue 1, 438.

(Continued)

*Primary Examiner* — Ralph A Lewis
(74) *Attorney, Agent, or Firm* — Zhigang Ma

(57) ABSTRACT

The present invention provides a trabecular porous tantalum dental implant and a preparation method thereof. The trabecular porous tantalum dental implant provided by the present invention has a cylindrical structure, and sequentially includes a top functional area, a middle functional area and a bottom functional area from top to bottom. The top functional area has a compact structure. The middle functional area has a porous bionic trabecular structure. The bottom functional area has a compact structure. The trabecular porous tantalum dental implant is integrally prepared through an additive manufacturing technology by using pure tantalum or medical tantalum alloy powder as a raw material. The trabecular porous tantalum dental implant provided by the present invention has a high friction force, strength and modulus close to those of human bones, an excellent bone ingrowth effect, high implantation stability and long service life.

9 Claims, 5 Drawing Sheets

(56) References Cited

U.S. PATENT DOCUMENTS

| | | | |
|---|---|---|---|
| 2011/0008754 A1* | 1/2011 | Bassett | A61C 8/0013 |
| | | | 433/175 |
| 2012/0156646 A1 | 6/2012 | Pelote | |
| 2013/0022943 A1 | 1/2013 | Collins et al. | |
| 2014/0030675 A1* | 1/2014 | Sanchez | A61C 8/0012 |
| | | | 433/174 |
| 2018/0200028 A1 | 7/2018 | Lomicka | |
| 2019/0290402 A1* | 9/2019 | Djemai | A61K 6/822 |
| 2020/0100874 A1* | 4/2020 | Ruetschi | A61F 2/30767 |
| 2021/0016348 A1* | 1/2021 | Sungail | A61C 8/0012 |
| 2021/0153982 A1* | 5/2021 | Wernle | A61C 13/0018 |
| 2022/0087788 A1* | 3/2022 | Selmoune | A61C 8/0024 |
| 2022/0387143 A1* | 12/2022 | Wysocki | A61C 8/0006 |

OTHER PUBLICATIONS

Jingzhou Yang et al., "Additive manufacturing of trabecular tantalum scaffolds by laser powder bed fusion Mechanical property evaluation and porous structure characterization", Materials Characterization, 2020, vol. 170 110694.

Hairui Gao et al., "Porous tantalum scaffolds Fabrication, structure, properties, and orthopedic applications", Materials & Design, 2021, vol. 210, 110095.

Hairui Gao et al., "Porous structure and compressive failure mechanism of additively manufactured cubic-lattice tantalum scaffolds", Materials Today Advances, 2021, vol. 12, 100183.

Wenliang Chen et al., "Fatigue behaviour and biocompatibility of additively manufactured bioactive tantalum graded lattice structures for load-bearing orthopaedic applications", Materials Science & Engineering C, 2021, vol. 130, 112461.

Xueying Wang et al., "Optimize the pore size-pore distribution-pore geometry-porosity of 3D-printed porous tantalum to obtain optimal critical bone defect repair capability", Biomaterials Advances, 2023, vol. 154, 213638.

Gaohairui et al., "Static compressive behavior and failure mechanism of tantalum scaffolds with optimized periodic lattice fabricated by laser-based additive manufacturing", 3D Printing and Additive Manufacturing, 2021, Manuscript ID 3DP-2021-0253.

Juyang Jiao et al., "Influence of porosity on osteogenesis, bone growth and osteointegration in trabecular tantalum scaffolds fabricated by additive manufacturing", Frontiers in Bioengineering and Biotechnology, 2023, vol. 11, 1117954.

Sarandeep S Huja et al., "Bone Ingrowth and Initial Stability of Titanium and Porous Tantalum Dental Implants A Pilot Canine Study", Implant Dentistry, 2013, vol. 22, No. 4.

Ling Li et al., "Comparison of 3D-Printed Dental Implants with Threaded Implants for Osseointegration: An Experimental Pilot Study", Materials, 2020, vol. 13, Issue 21, 4815.

Jianyu Chen et al., "Production of inter-connective porous dental implants by computer-aided design and metal three-dimensional printing", Journal of Biomaterials Applications, 2020, vol. 34, Issue 9, pp. 1227-1238.

* cited by examiner

TRABECULAR POROUS TANTALUM DENTAL IMPLANT AND PREPARATION METHOD THEREOF

CROSS-REFERENCE TO RELATED APPLICATIONS

This Application is related to and claims priority to Chinese Application No. 202010331329.1, filed Apr. 24, 2020, entitled TRABECULAR POROUS TANTALUM DENTAL IMPLANT AND PREPARATION METHOD THEREOF, the entirety of which is incorporated herein by reference.

GOVERNMENT RIGHTS STATEMENT

N/A.

FIELD

The present invention relates to the technical field of biomedical metal materials and oral implantation medical instruments, and in particular relates to a trabecular porous tantalum dental implant and a preparation method thereof.

BACKGROUND

A huge number of people lose teeth due to oral and maxillofacial diseases, wounds and severe dental caries, which remarkably impairs their health and life quality. With the development of science and technology in biomedical materials, stomatology, surgical navigation, minimally invasive surgery, advanced manufacturing and other fields, the modern dental implant technology emerged in the 1950s. Then, it was found by people that a biological metal implanted into a bone can be bonded with a surrounding bone tissue. Based on this principle, dental implants of pure titanium and titanium alloy are gradually commercialized. It is more and more common to select a dental implant to treat tooth loss in Clinical Science of Stomatology.

At present, the dental implant is mainly prepared by manufacturing titanium and a titanium alloy into dense screws through traditional mechanical processing. Because the mechanical performances of titanium and titanium alloy are quite different from that of human bone, especially their elastic moduli are much higher than that of human bone, there is a problem of aseptic loosening of about 5-10% of the dental implants due to osteolysis caused by stress shielding in clinical application. Also, titanium and titanium alloy dental implants can only slowly form surface osseointegration, and cannot form rapid bone ingrowth, which makes the implantation period be longer and that it is difficult to realize immediate implantation. Furthermore, for the middle-aged and elderly people with poor alveolar bone quality, osteoporosis and the like problems, the initial implantation stability of the titanium and titanium alloy dental implants is poor, resulting in large difficulty in implantation and long treatment period. Spraying a bioactive ceramic/glass coating on the surface of the implant and conducting surface roughening by acid etching still cannot completely solve the aforementioned problems. Therefore, it is urgent to adopt a new oral biomedical material system and a more advanced processing method to develop the next generation of dental implants.

A tantalum metal, as a biomedical material, has good ductility and toughness, high reliability, good fatigue resistance, corrosion resistance, and good biocompatibility with human tissues. In 1940, pure tantalum began to be used in the medical field of orthopedics. A tantalum wire, as a surgical suture, is used for suturing bones, tendons, fascias, internal organs, etc. A tantalum sheet, as a bone patch, is used for repairing a skull, fixing fractured limbs, and the like. Porous tantalum rods and blocks, as artificial bone fillers, are used for treatment of avascular necrosis of femoral head in early and middle stages, and for the repair of bone defects at various sites of a human body, interbody fusion, etc. Studies have proved that a tantalum metal has better biocompatibility, osteoconductivity, osseointegration and ability of inducing osteanagenesis than titanium and titanium alloy, and is an ideal material for the next generation of dental implants. However, the tantalum metal has a melting point up to 2996° C., and is easily oxidized to cause reduction in the mechanical performance, so it is not easy to prepare it into a dental implant. At present, there are some reports in the art that tantalum metal is applied to the dental implant, wherein the main body of the dental implant is still the titanium alloy, the middle portion is a porous structure obtained by depositing the tantalum metal on the surface of a glassy carbon skeleton with a chemical vapor deposition (CVD) coating technology, and then the main body of titanium alloy and the middle portion of thin porous tantalum layer are combined together in a mode of mechanical combination of separate units. Such a dental implant still has poor implantation stability, and a risk of delamination and detachment under the action of a torsional force during implantation.

SUMMARY

In view of this, an objective of the present invention is to provide a trabecular porous tantalum dental implant and a preparation method thereof. The trabecular porous tantalum dental implant provided by the present invention has an integral structure, an excellent mechanical performance, a high friction force, strength and modulus close to those of human bones, an excellent bone ingrowth effect, a high force of binding with a bone tissue, high implantation stability, excellent fatigue resistance and a long service life.

In order to realize the objective of the present invention, the present invention provides the following technical solutions:

A trabecular porous tantalum dental implant is provided. The trabecular porous tantalum dental implant has a cylindrical structure, and sequentially includes a top functional area, a middle functional area and a bottom functional area from top to bottom; the top functional area has a compact structure, the middle functional area has a porous bionic trabecular structure, the bottom functional area has a compact structure; the trabecular porous tantalum dental implant is integrally prepared through an additive manufacturing technology by using pure tantalum or medical tantalum alloy powder as a raw material.

In one embodiment, the trabecular porous tantalum dental implant has a total length of 5-25 mm, a diameter of 3-10 mm, a length of the top functional area of 1-10 mm, a length of the middle functional area of 1-15 mm, and a length of the bottom functional area of 1-10 mm.

In one embodiment, the outer side of the top functional area is provided with a thread or groove for mechanical fixation, and the depth of the thread or groove is 0.1-3 mm; an upper surface of the top functional area is provided with a notch for connecting an abutment, and the notch has a depth of 0.1-10 mm and a diameter of 1-8 mm.

In one embodiment, the porous bionic trabecular structure has an average pore diameter of 100-1500 μm, an average wire diameter of 200-1000 μm, a porosity of 10-90%, and a pore connectivity greater than 90%.

In one embodiment, the center of the middle functional area is provided with a reinforcing pillar, and the reinforcing pillar has a length of 1-15 mm and a diameter of 1-9.5 mm.

In one embodiment, the outer side of the bottom functional area is provided with a thread or groove for mechanical fixation, and the depth of the thread or groove is 0.1-3 mm.

In one embodiment, the purity of the pure tantalum is greater than 99%, the content of tantalum element in the medical tantalum alloy is greater than 1 wt %, and the particle size of the pure tantalum or the medical tantalum alloy powder is independently 10-150 μm.

In one embodiment, the additive manufacturing technology includes a laser melting additive manufacturing technology or an electron-beam melting additive manufacturing technology.

The present invention provides a method for preparing the trabecular porous tantalum dental implant described by the aforementioned solution, which includes the following steps: constructing a three-dimensional model of the trabecular porous tantalum dental implant by using a modeling software, and conducting additive manufacturing according to the constructed model by using pure tantalum or medical tantalum alloy powder as a raw material.

BENEFICIAL EFFECTS (1) The middle functional area of the trabecular porous tantalum dental implant provided by the present invention is a porous trabecular structure that has high porosity which dense titanium and titanium alloy implants do not have, has good connectivity, can realize internal bone ingrowth in addition to surface osseointegration, can form high-strength biological fixation, has high strength of osseointegration, has good initial implantation stability and long-term stability, can be applied to immediate implantation, and shortens the implantation period. The middle functional area of the implant provided by the present invention has a compressive strength up to more than 30 MPa, a bending strength up to more than 50 MPa, an elastic modulus of 0.5-10 GPa, and an excellent comprehensive mechanical performance; has a fatigue performance more than 5 million times under the conditions of a cyclic compressive stress of 50-500 N and a loading frequency of 15 Hz; forms a friction pair with a membranous cortical bone, and shows a friction coefficient greater than 1.3 upon test; and has pore connectivity above 90% as detected by industrial CT and scanning electron microscopy (SEM).

(2) The material of the dental implant provided by the present invention is pure tantalum or the medical tantalum alloy. The biological characteristics and unique porous bionic trabecular structure of the tantalum metal itself endow the dental implant of the present invention with excellent osteoconduction and osteoinduction performances, can promote bone tissue regeneration, and is not only suitable for dental implantation after teeth loss of healthy people, but also can be used for middle-aged and elderly people with poor alveolar bone quality, osteoporosis, diabetes and the like problems.

(3) The thickness of the middle functional area of the trabecular porous tantalum dental implant provided by the present invention is easy to adjust, and the porous portion can penetrate through the diameter of the entire implant; and compared with the solution in which a porous structure is prepared by depositing the tantalum metal on the surface of a glassy carbon skeleton in the prior art, the trabecular porous tantalum dental implant provided by the present invention can better improve the bone ingrowth volume and form firmer biological binding.

(4) The trabecular porous tantalum dental implant provided by the present invention has an integral structure, and the material of the top functional area and the bottom functional area is pure tantalum or a tantalum alloy, so that the trabecular porous tantalum dental implant has better bone integration and osseointegration capability than the titanium alloy, does not have the risk of delamination and detachment during implantation, has better overall implantation stability, a higher success rate and a longer service life.

(5) When the trabecular porous tantalum dental implant of the present invention is in use, the top functional area and the bottom functional area form physical fixation through thread mechanical bonding, and at the same time form biological fixation through surface osseointegration; and the middle functional area forms internal biological fixation through bone ingrowth, which greatly enhances the bonding strength between the implant and the surrounding bone tissue and improves the occlusal tolerance of the implant.

(6) The present invention conducts integrated preparation with the additive manufacturing technology, and the obtained trabecular porous tantalum dental implant has a densely sintered strut and a nano crystal grain microstructure, which endows it with an excellent mechanical performance, reliability and fatigue resistance. Compression experiments have shown that the middle functional area still has good strength after deformation of 20% of it, and still has no destructive fracture after compression deformation of 70% of it, indicating that it has excellent ductility and toughness, good mechanical reliability and safety.

(7) the present invention designs the self-owned property and controllability by utilizing the porous structure design unique to the additive manufacturing technology, and the prepared trabecular porous tantalum dental implant has mechanical characteristics similar to those of the human bone, so that the mechanical shielding effect can be effectively reduced, aseptic loosening and failure of the dental implant caused by osteolysis is avoided, and the implantation success rate and the service life of the implant are improved.

(8) The present invention utilizes additive manufacturing to prepare the trabecular porous tantalum dental implant, and the additive manufacturing technology is an intelligent manufacturing technology, has the advantages of digitization, greenness, no mold, high efficiency, high precision and the like, and can realize personalized customization and large-scale production.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
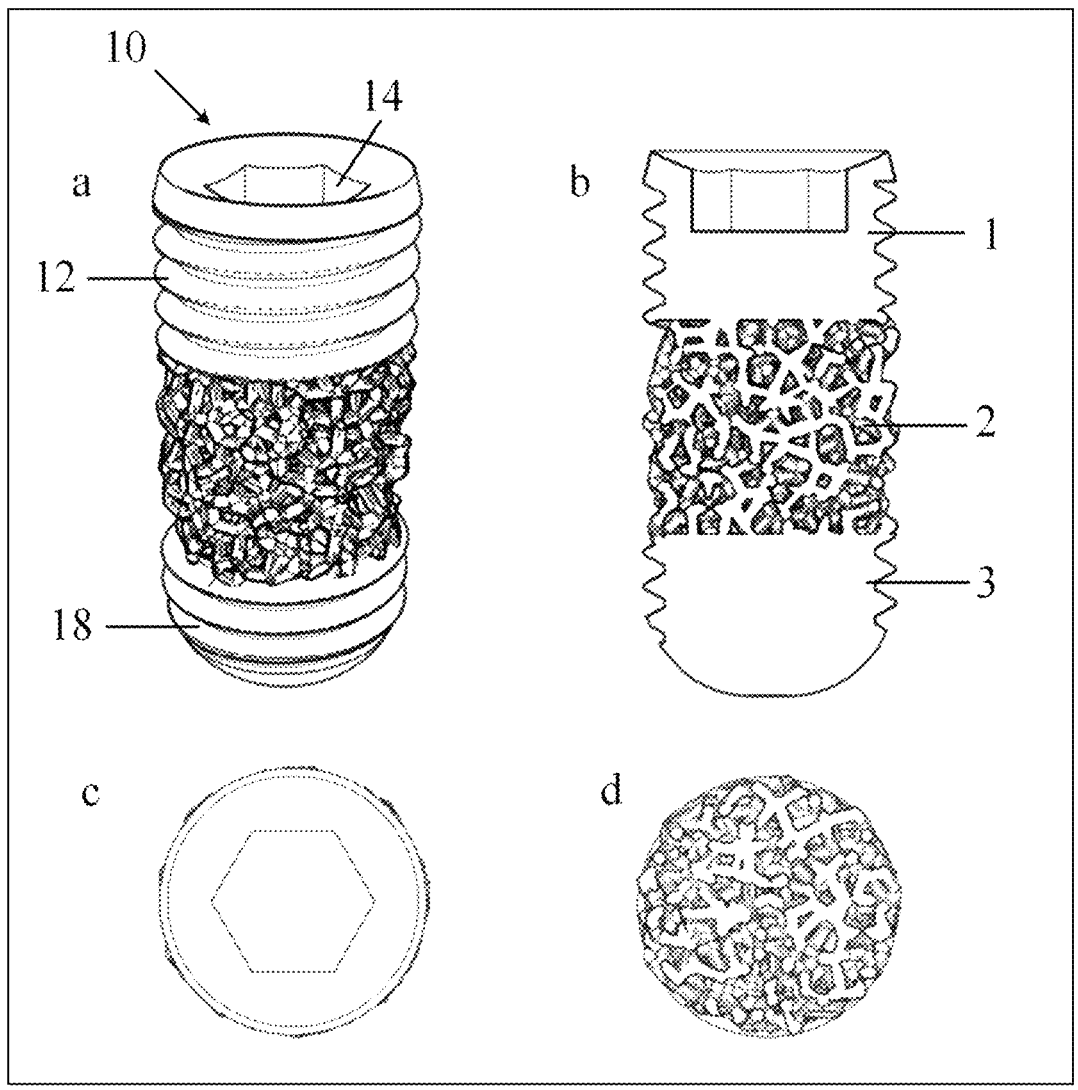
FIG. 1 is a structural diagram of a trabecular porous tantalum dental implant of the present invention, wherein: a is a three-dimensional display diagram of the structure of the implant; and b is a longitudinal section view of the implant, wherein: 1—top functional area, 2—middle functional area, and 3—bottom functional area; c is a top plan view; d is a section view of the middle portion.

The present invention provides a trabecular porous tantalum dental implant, the structural schematic diagram of it is shown in FIG. 1, in which a is a three-dimensional display diagram of the implant; b is a longitudinal section of the implant, wherein: 1—top functional area, 2—middle functional area, 3—bottom functional area; c is a top plan view; and d is a section view of the middle portion.

In the present invention, the trabecular porous tantalum dental implant 10 has a cylindrical structure, and sequentially includes a top functional area 1, a middle functional area 2, and a bottom functional area 3 from top to bottom. The top functional area 1 has a compact structure. The middle functional area 2 has a porous bionic trabecular structure. The bottom functional area 3 has a compact structure. The trabecular porous tantalum dental implant 10 is integrally prepared through an additive manufacturing technology by using pure tantalum or medical tantalum alloy powder as a raw material.

In the present invention, the trabecular porous tantalum dental implant 10 has a total length of preferably 5-25 mm and more preferably 8-22 mm, and a diameter of preferably 3-10 mm and more preferably 5-8 mm.

The trabecular porous tantalum dental implant 10 provided by the present invention includes a top functional area 1. In the present invention, the top functional area 1 has a compact structure, and the length of the top functional area 1 is preferably 1-10 mm, and more preferably 3-8 mm; the outer side of the top functional area 1 is preferably provided with a thread or groove 12 for mechanical fixation, and the depth of the thread or groove 12 is preferably 0.1-3 mm, and more preferably 0.5-2 mm; the upper surface of the top functional area 1 is preferably provided with a notch 14 for connecting an abutment, and the notch 14 has a depth of preferably 0.1-10 mm and more preferably 0.3-8 mm, and a diameter of preferably 1-8 mm and more preferably 3-5 mm; and the notch 14 is preferably an inner hexagonal notch.

The trabecular porous tantalum dental implant 10 provided by the present invention includes a middle functional area 2. In the present invention, the length of the middle functional area 2 is preferably 1-15 mm, more preferably 2-15 mm, and still more preferably 3-12 mm; the porous bionic trabecular structure has an average pore diameter of 100-1500 μm and more preferably 300-1200 μm, an average wire diameter of preferably 200-1000 μm and more preferably 300-800 μm, a porosity of preferably 10-90% and more preferably 20-80%, and a pore connectivity of preferably greater than 90%. The middle functional area 2 of the trabecular porous tantalum dental implant 10 provided by the present invention is a porous bionic trabecular structure, and the length of the middle functional area 2 is easy to adjust. The porous portion can penetrate through the diameter of the entire implant, so that the bone ingrowth volume can be better improved, and firmer biological binding can be formed.

In the present invention, the centre of the middle functional area 2 is preferably provided with a reinforcing pillar 16, and the reinforcing pillar 16 has a length of preferably 1-15 mm, more preferably 2-15 mm, and further preferably 3-12 mm, and a diameter of preferably 1-9.5 mm, and more preferably 2-8 mm; and the material of the reinforcing pillar 16 is also pure tantalum or a medical tantalum alloy, and thus the reinforcing pillar 16 can be prepared integrally in the additive manufacturing process.

The trabecular porous tantalum dental implant provided by the present invention includes a bottom functional area 3. In the present invention, the bottom functional area 3 is a compact structure; the outer side of the bottom functional area 3 is preferably provided with a thread or groove 18 for mechanical fixation, and the depth of the thread or groove 18 is preferably 0.1-3 mm, and more preferably 0.5-2.5 mm; and the bottom surface of the bottom functional area 3 is preferably spherical.

In the present invention, the trabecular porous tantalum dental implant 10 is integrally prepared by using pure tantalum or medical tantalum alloy powder as a raw material through an additive manufacturing technology; the purity of the pure tantalum is preferably >99%, and the content of tantalum element in the medical tantalum alloy is preferably >1 wt %, and more preferably 5-95 wt %; the particle size of the pure tantalum or medical tantalum alloy powder is independently preferably 10-150 μm, and more preferably 20-130 μm; the pure tantalum or medical tantalum alloy powder is preferably spherical powder, and the sphericity of the spherical powder is preferably greater than 80%, and more preferably 85-99%; in the present invention, the medical tantalum alloy powder is preferably mixed powder of tantalum and titanium or Ti35Nb3Zr2Ta prealloyed powder; the mixed powder of tantalum and titanium preferably includes 70 vol % of tantalum and 30 vol % of titanium. The present invention prepares the dental implant of the present invention by using the additive manufacturing technology, and the three functional areas (i.e., the top, middle and bottom functional areas) of the obtained dental implant are of an integral structure instead of being mechanical spliced into the dental implant. Compared with the dental implant formed by mechanical splicing, the dental implant provided by the present invention has better implanting stability and no risk of delamination and detachment.

In the present invention, the additive manufacturing technology preferably includes a laser melting additive manufacturing technology or an electron-beam melting additive manufacturing technology.

The present invention also provides a method for preparing the trabecular porous tantalum dental implant described by the aforementioned solution, which includes the following steps: constructing a three-dimensional model of the trabecular porous tantalum dental implant by using a modelling software, and conducting additive manufacturing according to the constructed model by using pure tantalum or medical tantalum alloy powder as a raw material.

The present invention has no special requirements on the modelling software, and a modelling software well known to those skilled in the art can be used.

In the present invention, after the three-dimensional model is obtained, the three-dimensional model is preferably converted into a format required by a printing device and the format is introduced into an additive manufacturing device, and then pure tantalum or medical tantalum alloy powder containing a tantalum alloy is used as a raw material to conduct printing. In the present invention, when the additive manufacturing is laser melting additive manufacturing, the printing parameters are preferably: a laser power of 150-300 W and preferably 180-260 W, a scanning speed of 100-350 mm/s and preferably 120-330 mm/s, a scanning line spacing of 0.05-0.1 mm and preferably 0.06-0.09 mm, a slice layer thickness of 20-50 μm and preferably 30-40 μm, a substrate temperature of 100-200° C. and preferably 130-180° C.; and when the additive manufacturing is electron-beam melting additive manufacturing, the printing parameters are preferably: a powder preheating temperature of 900-1500° C. and more preferably 1000-1400° C., a scanning current of 5-15 mA and more preferably 6-12 mA, a scanning speed of $1.0 \times 10^4$-$8.0 \times 10^5$ mm/s and preferably $2 \times 10^4$-$7 \times 10^5$ mm/s, and a slice layer thickness of preferably 20-50 μm and preferably 30-40 μm.

In the present invention, after printing is completed, preferably the printing molded part is subjected to post-processing to obtain the trabecular porous tantalum dental implant of the present invention. In the present invention, the post-processing preferably includes powder removal, wire cutting, support removal, sand blasting, ultrasonic cleaning and heat treatment that are conducted sequentially.

In the present invention, the powder removal is preferably physical removal of powder, and the specific powder removal approach is preferably one or more of suction through a wet explosion-proof dust collector, blowing with compressed air and ultrasonic cleaning. In the present invention, the powder on the surface of the printing molded part is removed through powder removal.

In the present invention, the wire cutting is preferably conducted by using a discharge molybdenum wire cutting machine, and the electric spark of the molybdenum wire slightly melts the metal to form cutting, so that the mechanical damage to the cutting surface is small, and the precision is high. In the present invention, the printing molded part is cut and separated from a substrate by wire cutting.

The present invention has no special requirements on the support removal, and the support connected to the substrate at the lower part of the printing molded part can be disassembled in a manner well known to those skilled in the art. In a specific embodiment of the present invention, the support can be slightly knocked or pinched off with a tool such as a vice.

In the present invention, non-metallic sand is preferably used for the sand blasting, and the particle size of the non-metallic sand is preferably 100-500 mesh, and more preferably 200-400 mesh.

In the present invention, the ultrasonic cleaning is preferably performed sequentially with absolute ethanol and distilled water, and the total number of cleaning in absolute ethanol and distilled water is preferably greater than 10, more preferably 12-20, and the total cleaning time is preferably greater than 5 h, and more preferably 7-10 h.

In the present invention, the heat treatment is preferably a vacuum stress-relief annealing treatment. The annealing temperature of the heat treatment is preferably 850-1050° C., and more preferably 900-1000° C., the vacuum degree is preferably $<10 \times 10^{-3}$ Pa, and the time of keeping at this temperature is preferably 1-5 h, and more preferably 2-4 h.

The solution provided by the present invention will be described in detail in connection with the following embodiments, but they should not be construed as limiting the claimed scope of the present invention.

Example 1

Figure 2:
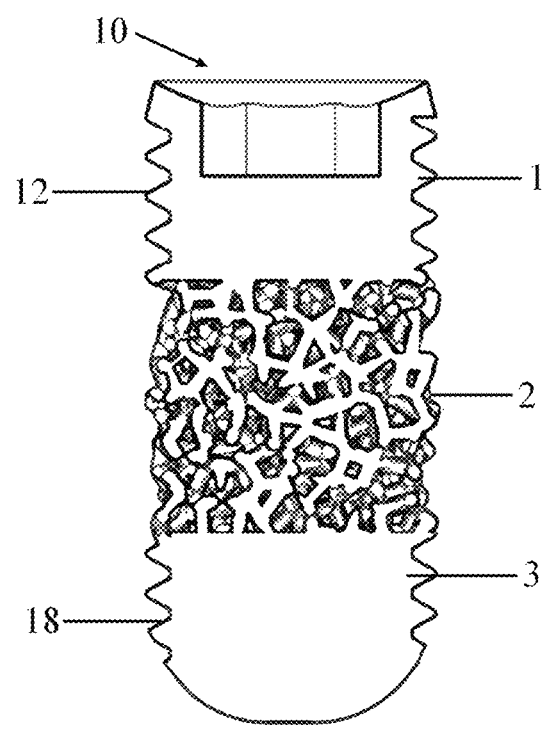
FIG. 2 is a longitudinal sectional view of the trabecular porous tantalum dental implant of Example 1.

A structure of three functional areas was designed by utilizing a professional modelling software, so as to construct a three-dimensional model of a trabecular porous tantalum dental implant, wherein the top functional area 1 was a compact structure; the middle functional area 2 was a porous bionic trabecular structure; and the bottom functional area 3 was a compact structure. The implant 10 had a total length of 16 mm and a diameter of 6 mm, the length of the top functional area 1 was 5 mm, the length of the middle functional area 2 was 7 mm, and the length of the bottom functional area 3 was 4 mm. The outer side of the top functional area 1 was provided with a thread 12 for mechanical fixation, with a depth of the thread 12 being 1 mm; and the upper surface of the top functional area 1 was provided with an inner hexagonal notch 14 for connecting an abutment, with a depth of the notch 14 being 3 mm and a diameter of the notch being 3 mm. The middle functional area 2 was a porous bionic trabecular structure with an average pore diameter of 500 μm, an average wire diameter of 300 μm, a porosity of 70%, and a pore connectivity of 99%. The centre of the porous structure had no internal reinforcing pillar. The outer side of the bottom functional area 3 was provided with a thread 18 for mechanical fixation, with a depth of the thread 18 being 1 mm. The bottom face of the implant 10 was spherical. The longitudinal sectional view of the trabecular porous tantalum dental implant 10 of Example 1 was shown in FIG. 2.

The three-dimensional model was converted into a format required for a printing device, and the format was introduced into the device. Printing was conducted by using pure tantalum powder as the raw material and adopting a laser melting additive manufacturing process. The pure tantalum powder had a purity>99.9%, a particle size of 15-45 μm, and a sphericity of 95. The main printing process parameters of laser melting were: a laser power of 150 W, a scanning speed of 200 mm/s, a scanning line spacing of 0.05 mm, a slice layer thickness of 50 μm, and a substrate temperature of 200° C.

After printing was completed, the printing molded parts were sequentially subjected to powder removal, wire cutting, support removal, sand blasting, ultrasonic cleaning and heat treatment. The powder removal operation is physical removal of powder, which specifically included removing the powder by suction through a wet explosion-proof dust collector, blowing with compressed air, and ultrasonic cleaning. The wire cutting was conducted by a discharge molybdenum wire cutting machine. The support removal was disassembling the support connected to the substrate at the lower part of the printing molded part by a vice. The sand blasting step used non-metallic sand with a particle size of 500 meshes. The ultrasonic cleaning was carried out by using absolute ethanol and distilled water in sequence, with a total number of cleaning of 20 and a total cleaning time of 8 h. The heat treatment was vacuum stress-relief annealing treatment. The annealing temperature was 900° C., the vacuum degree<5×10⁻³ Pa, and the time of keeping at this temperature was 3 h.

The mechanical performance of the middle functional area 2 of the trabecular porous tantalum dental implant 10 prepared in Example 1 was tested, and the results showed that the middle functional area 2 had a compressive strength of 52±5.8 MPa, a bending strength greater than 77±6.3 MPa, an elastic modulus of 2.3±0.2 GPa, and thus the comprehensive mechanical performance was excellent. Under the conditions of a cyclic compressive stress of 50-500 N and a loading frequency of 15 Hz, the middle functional area 2 had a fatigue performance of 9.3±0.6 million times. The friction coefficient of the friction pair composed of the middle functional area 2 and a membranous cortical bone was 1.6±0.3 upon the test of friction coefficient.

Figure 3:
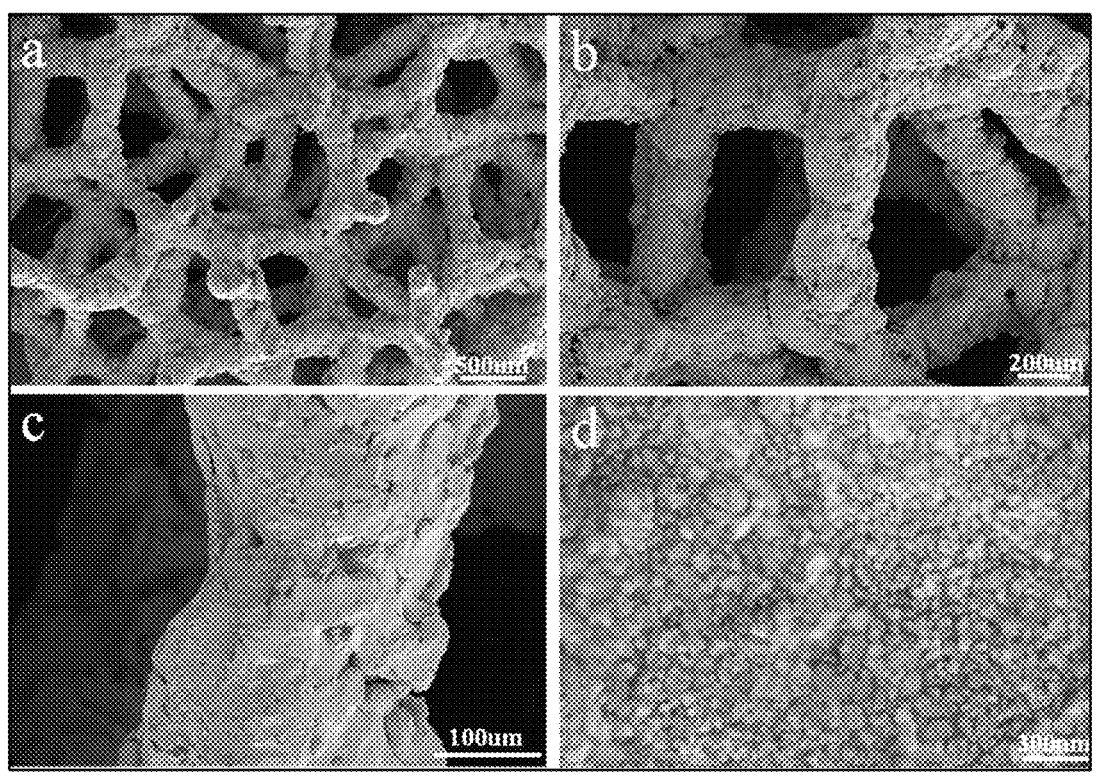
FIG. 3 is a microstructure photograph of the middle functional area of the trabecular porous tantalum dental implant prepared in Example 1, wherein a is the porous trabecular structure observed when the scale is 500 μm; b is the porous trabecular structure observed when the scale is 200 μm; c is a dense strut formed by melting and sintering; and d is the observed nano crystal grain.

FIG. 3 was a SEM graph of the middle functional area 2 of the obtained trabecular porous tantalum dental implant 10 prepared in Example 1, wherein a was the porous trabecular structure observed when the scale is 500 b was the porous trabecular structure observed when the scale is 200 μm; c was a dense strut formed by melting and sintering; and d was the observed nano crystal grain. It could be seen from FIG. 3 that, the porous bionic trabecular structure of the middle functional area 2 had a relatively high porosity, and the struts formed by the laser melting additive manufacturing were very dense, and the surface of the strut had a nano crystal grain microstructure.

The connectivity of the porous structure in the middle functional area 2 was greater than 90%.

Figure 4:
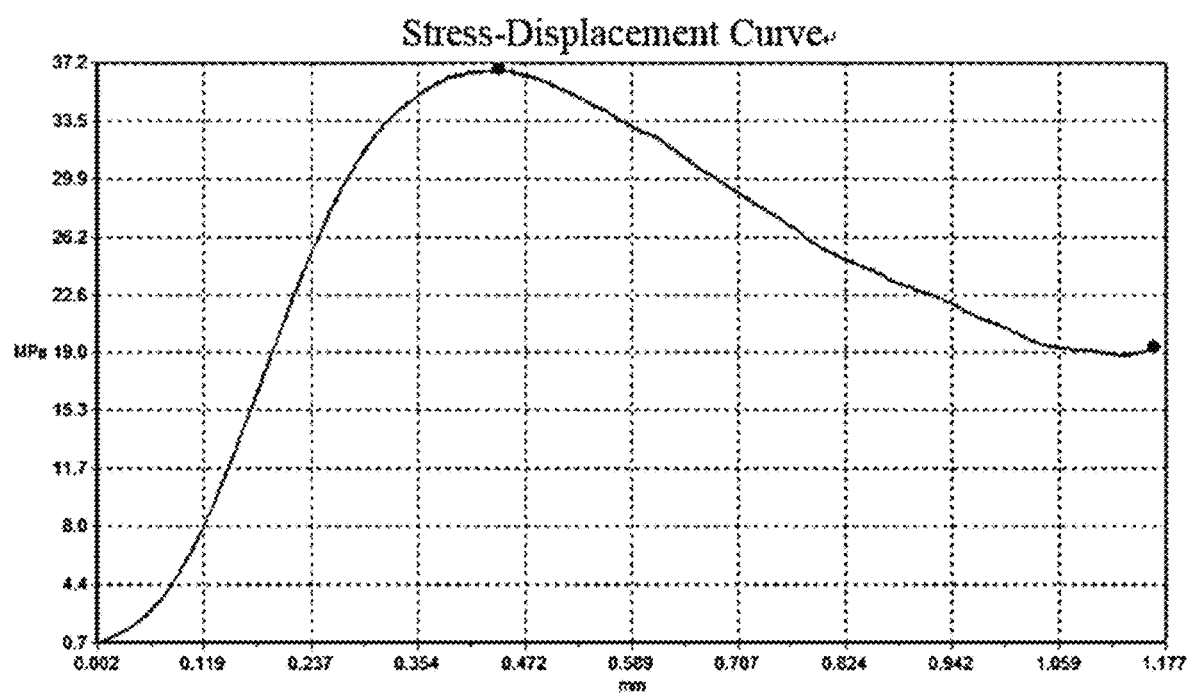
FIG. 4 is a stress-strain curve of the compression experiment of the middle functional area of the trabecular porous tantalum dental implant prepared in Example 1.
Figure 5:
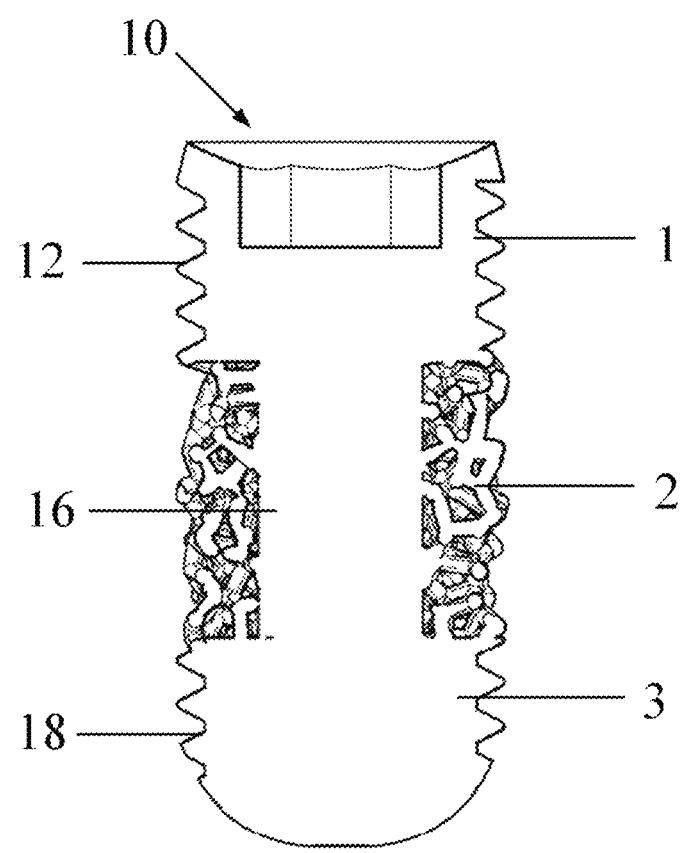
FIG. 5 is a longitudinal sectional view of a trabecular porous tantalum dental implant of Example 2.

FIG. 4 is a stress-strain curve of the compression experiment of the middle functional area 2 of the obtained trabecular porous tantalum dental implant 10; and it could be seen from FIG. 4 that the middle functional area 2 still had a good strength when 20% of it was subjected to compression deformation.

The middle functional area 2 still had no destructive fracture after compression deformation of 70% of it, indicating that it had excellent ductility and toughness, good mechanical reliability and safety.

Example 2

Figure 6:
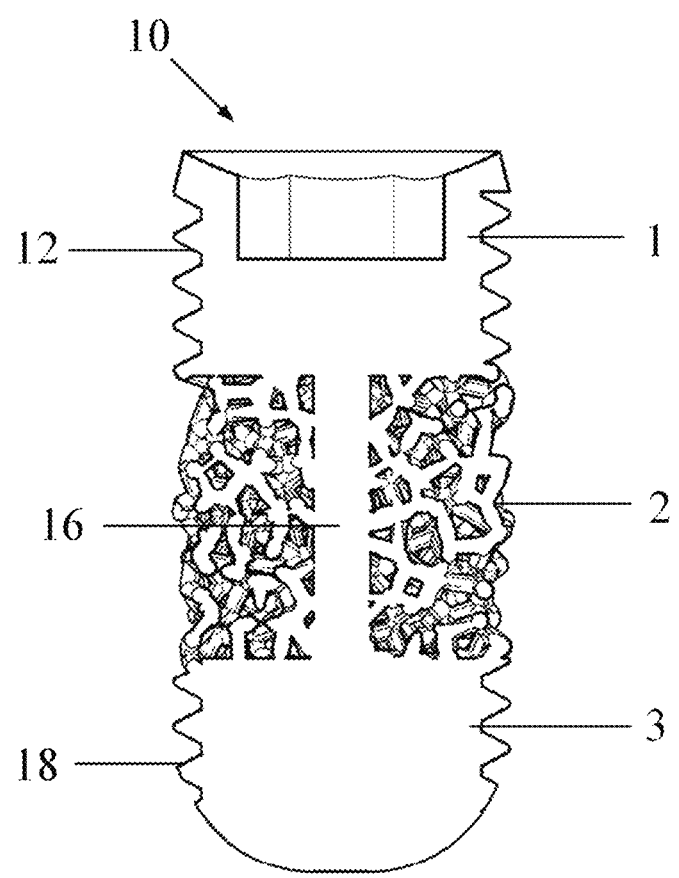
FIG. 6 is longitudinal sectional view of the trabecular porous tantalum dental implant of Example 3.

A structure of three functional areas was designed by utilizing a professional modelling software, so as to construct a three-dimensional model of a trabecular porous tantalum dental implant 10, wherein the top functional area 1 was a compact structure; the middle functional area 2 was a porous bionic trabecular structure; and the bottom functional area 3 was a compact structure. The implant 10 had a total length of 13 mm and a diameter of 5 mm, the length of the top portion 1 was 4 mm, the length of the middle portion 2 was 5 mm, and the length of the bottom portion 3 was 4 mm. The outer side of the top functional area 1 was provided with a thread 12 for mechanical fixation, with a depth of the thread 12 being 0.8 mm; and the upper surface of the top functional area 1 was provided with an inner hexagonal notch 14 for connecting an abutment, with a depth of the notch 14 being 2 mm and a diameter of the notch 14 being 3 mm. The middle functional area 2 had a porous bionic trabecular structure with an average pore diameter of 470 μm, an average wire diameter of 330 μm, a porosity of 75%, and a pore connectivity of 99%. The centre of the porous structure had an internal reinforcing pillar 16 with a diameter of 2.5 mm. The outer side of the bottom functional area 3 was provided with a thread 18 for mechanical fixation, with a depth of the thread 18 being 0.8 mm. The bottom face of the implant was spherical. The longitudinal sectional view of the trabecular porous tantalum dental implant 10 of Example 2 was shown in FIG. 6.

The three-dimensional model was converted into a format required for a printing device, and the format was introduced into the device. Printing was conducted by using mixed powder of tantalum and titanium as the raw material and adopting a laser melting additive manufacturing process. The mixed powder included 70 vol % of tantalum and 30 vol % of titanium, had a particle size of 15-45 μm, and a sphericity of 97. The main printing process parameters of laser melting were: a laser power of 200 W, a scanning speed of 150 mm/s, a scanning line spacing of 0.1 mm, a slice layer thickness of 30 μm, and a substrate temperature of 150° C.

After printing was completed, the printing molded parts were sequentially subjected to powder removal, wire cutting, support removal, sand blasting, ultrasonic cleaning and heat treatment. The powder removal operation is physical removal of powder, which specifically included removing the powder by suction through a wet explosion-proof dust collector, blowing with compressed air, and ultrasonic cleaning. The wire cutting was conducted by a discharge molybdenum wire cutting machine. The support removal was disassembling the support connected to the substrate at the lower part of the printing molded part by a vice. The ultrasonic cleaning was carried out by using absolute ethanol and distilled water in sequence, with a total number of cleaning of 18 and a total cleaning time of 10 h. The sand blasting step used non-metallic sand with a particle size of 500 meshes. The heat treatment was vacuum stress-relief annealing treatment. The annealing temperature was 950° C., the vacuum degree<5×10⁻³ Pa, and the time of keeping at this temperature was 2 h.

The mechanical performance of the middle functional area 2 of the trabecular porous tantalum dental implant 10 prepared in Example 2 was tested, and the results showed that the middle functional area 2 had a compressive strength of 47±3.6 MPa, a bending strength greater than 65±4.3 MPa, an elastic modulus of 2.0±0.3 GPa, and thus the comprehensive mechanical performance was excellent. Under the conditions of a cyclic compressive stress of 50-500 N and a loading frequency of 15 Hz, the middle functional area 2 had a fatigue performance of 7.7±0.5 million times. The friction coefficient of the friction pair composed of the middle functional area 2 and a membranous cortical bone was 1.4±0.3 upon the test of friction coefficient.

Example 3

A structure of three functional areas was designed by utilizing a professional modelling software, so as to construct a three-dimensional model of a trabecular porous tantalum dental implant 10, wherein the top functional area was a compact structure; the middle functional area 2 was a porous bionic trabecular structure; and the bottom functional area 3 was a compact structure. The implant had a total length of 12 mm and a diameter of 4.1 mm, the length of the top portion 1 was 4 mm, the length of the middle portion 2 was 5 mm, and the length of the bottom portion 3 was 3 mm. The outer side of the top functional area I was provided with a thread 12 for mechanical fixation, with a depth of the thread 12 being 0.7 mm; and the upper surface of the top functional area 1 was provided with an inner hexagonal notch 14 for connecting an abutment, with a depth of the notch 14 being 2 mm and a diameter of the notch 14 being 3 mm. The middle functional area 2 had a porous bionic trabecular structure with an average pore diameter of 600

μm, an average wire diameter of 350 μm, a porosity of 68%, and a pore connectivity of 99%. The centre of the porous structure had an internal reinforcing pillar 16 with a diameter of 1mm. The outer side of the bottom functional area 3 was provided with a thread 18 for mechanical fixation, with a depth of the thread 18 being 0.7 mm. The bottom face of the implant was spherical. The longitudinal sectional view of the trabecular porous tantalum dental implant 10 of Example 3 was shown in FIG. 6.

The three-dimensional model was converted into a format required for a printing device, and the format was introduced into the device. Printing was conducted by using a prealloyed powder of titanium-niobium-zirconium-tantalum alloy Ti35Nb3Zr2Ta as a raw material and adopting a powder-bed laser melting additive manufacturing process. The preallyed powder of titanium-niobium-zirconium-tantalum alloy had a particle size of 53-105 μm, and a sphericity of 93. The main printing process parameters of the electron-beam melting were: a powder preheating temperature of 1000° C., a scanning current of 15 mA, a scanning speed of $5.0 \times 10^5$ mm/s, and a slice layer thickness of 20 μm.

After printing was completed, the printing molded parts were sequentially subjected to powder removal, wire cutting, support removal, sand blasting, ultrasonic cleaning and heat treatment. The powder removal operation is physical removal of powder, which specifically included removing the powder by suction through a wet explosion-proof dust collector, blowing with compressed air, and ultrasonic cleaning. The wire cutting was conducted by a discharge molybdenum wire cutting machine. The support removal was disassembling the support connected to the substrate at the lower part of the printing molded part by a vice. The sand blasting step used non-metallic sand with a particle size of 300 meshes. The ultrasonic cleaning was carried out by using absolute ethanol and distilled water in sequence, with a total number of cleaning of 15 and a total cleaning time of 7 h. The heat treatment was vacuum stress-relief annealing treatment. The annealing temperature was 1000° C., the vacuum degree $<5 \times 10^{-3}$ Pa, and the time of keeping at this temperature was 1.5 h.

The mechanical performance of the middle functional area 2 of the trabecular porous tantalum dental implant 10 prepared in Example 3 was tested, and the results showed that the middle functional area 2 had a compressive strength of 37±4.3 MPa, a bending strength greater than 55±3.7 MPa, an elastic modulus of 2.1±0.3 GPa, and thus the comprehensive mechanical performance was excellent. Under the conditions of a cyclic compressive stress of 50-500 N and a loading frequency of 15 Hz, the middle functional area 2 had a fatigue performance of 7.5±0.36 million times. The friction coefficient of the friction pair composed of the middle functional area 2 and a membranous cortical bone was 1.5±0.2 upon the test of friction coefficient.

Example 4

The bone ingrowth effect was determined by a large animal experiment. Healthy adult goats were taken as experimental animal models, defect models were constructed in medullary cavities of femoral heads of left and right hind limbs of each animal. The trabecular porous tantalum dental implant of the present invention and a control sample—a porous titanium alloy Ti6Al4V, were respectively implanted into respective models, with the sample specifications being the same as those of Example 2. Implantation operation: by adopting the distal lateral approach of femur, a 1 cm incision was made at the lateral femur, and a cylindrical bone and periosteal defect with a diameter of 5 mm and a depth of 10 mm was made at the lateral condyle of femur at a low speed by a trephine, and was rinsed with 0.9% normal saline, then the wound was closed layer by layer according to sample materials prepared before the grouped implantation operations, and the animals were fed with conventional high-protein feed and were reared in pens. The animals were killed at 1 month and 3 months after implantation. A local segment of the implanted sample was taken out, the bonding strength between the implanted sample and the surrounding bone tissue was detected by an axial stress push-out method, and Micro-CT scanning was conducted to qualitatively and quantitatively evaluate the bone ingrowth effect, including the volume of the new bone, etc. Hard tissue sections were stained to evaluate the effect of new bone ingrowth.

The results of the large animal experiment showed that, the bonding strength between the implant of the present invention and the surrounding bone tissue was greater than 18 MPa one month after operation; the volume ratio of new bone ingrowth is higher than 25% one month after operation, higher than 60% three months after operation, and higher than 85% three months after operation, such that the implant of the present invention was far better than the titanium alloy dental implant.

The above description is only preferred embodiments of the present invention. It should be pointed out that, for those of ordinary skills in the art, several improvements and modifications can be made without departing from the principle of the present invention. These improvements and modifications should also be considered as falling into the claimed scope of the present invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A method for preparing a trabecular porous tantalum dental implant, the method for preparing the trabecular porous tantalum dental implant comprising the following steps:
   constructing a three-dimensional model of the trabecular porous tantalum dental implant by using a modeling software;
   conducting additive manufacturing according to the constructed model by using pure tantalum or medical tantalum alloy powder as a raw material to obtain a printing molded part;
   conducting powder removal on the printing molded part to remove powder on a surface of the printing molded part to obtain a first processed printing molded part;
   conducting wire cutting on the first processed printing molded part to separate from a substrate to obtain a second processed printing molded part;
   conducting support removal on the second processed printing molded part to remove a support of the second processed printing molded part to obtain a third processed printing molded part;
   conducting sand blasting on the third processed printing molded part with non-metallic sand to obtain a fourth processed printing molded part, wherein a particle size of the non-metallic sand is 100-500 mesh;

conducting ultrasonic cleaning on the fourth processed printing molded part to obtain a fifth processed printing molded part; and conducting a vacuum stress-relief annealing treatment on the fifth processed printing molded part to obtain the trabecular porous tantalum dental implant; wherein a annealing temperature of the vacuum stress-relief annealing treatment is 850-1050° C., a vacuum degree of the vacuum stress-relief annealing treatment is less than $10*10^{-3}$ pa, and a time of keeping at the annealing temperature is 1-5 h;

wherein the trabecular porous tantalum dental implant having a cylindrical structure, and sequentially comprising:

a top functional area;

a middle functional area; and a bottom functional area from top to bottom;

the top functional area having a compact structure, the middle functional area having a porous bionic trabecular structure, and the bottom functional area having a compact structure; and the trabecular porous tantalum dental implant being integrally prepared through an additive manufacturing technology by using pure tantalum or medical tantalum alloy powder as a raw material;

wherein the porous bionic trabecular structure penetrates through the trabecular porous tantalum dental implant along a diameter of the cylindrical structure and fills up the middle functional area; and wherein a bottom surface of the bottom functional area is spherical.

2. The method for preparing the trabecular porous tantalum dental implant according to claim 1, wherein the trabecular porous tantalum dental implant has a total length of 5-25 mm, a diameter of 3-10 mm, a length of the top functional area of 1-10 mm, a length of the middle functional area of 1-15 mm, and a length of the bottom functional area of 1-10 mm.

3. The method for preparing the trabecular porous tantalum dental implant according to claim 2, wherein an outer side of the top functional area is provided with a thread or groove for mechanical fixation, and the depth of the thread or groove is 0.1-3 mm; and an upper surface of the top functional area is provided with a notch for connecting an abutment, and the notch has a depth of 0.1-10 mm and a diameter of 1-8 mm; and the notch is an inner hexagonal notch.

4. The method for preparing the trabecular porous tantalum dental implant according to claim 2, wherein an outer side of the bottom functional area is provided with a thread or groove for mechanical fixation, and the depth of the thread or groove is 0.1-3 mm.

5. The method for preparing the trabecular porous tantalum dental implant according to claim 1, wherein an outer side of the top functional area is provided with a thread or groove for mechanical fixation, and the depth of the thread or groove is 0.1-3 mm; and an upper surface of the top functional area is provided with a notch for connecting an abutment, and the notch has a depth of 0.1-10 mm and a diameter of 1-8 mm; and the notch is an inner hexagonal notch.

6. The method for preparing the trabecular porous tantalum dental implant according to claim 1, wherein the porous bionic trabecular structure has an average pore diameter of 100-1500 μm, a porosity of 10-90%, and a pore connectivity greater than 90%.

7. The method for preparing the trabecular porous tantalum dental implant according to claim 1, wherein a purity of the pure tantalum is greater than 99%, a content of a tantalum element in the medical tantalum alloy powder is greater than 1 wt %, and the particle size of the pure tantalum or the medical tantalum alloy powder is independently 10-150 μm.

8. The method for preparing the trabecular porous tantalum dental implant according to claim 1, wherein the additive manufacturing technology comprises a laser melting additive manufacturing technology or an electron-beam melting additive manufacturing technology.

9. The method according to claim 1, wherein:

the additive manufacturing is laser melting additive manufacturing, and printing parameters of the laser melting additive manufacturing are: a laser power of 150-300 W, a scanning speed of 100-350 mm/s, a scanning line spacing of 0.05-0.1 mm, a slice layer thickness of 20-50 μm, and a substrate temperature of 100-200° C.; or the additive manufacturing is electron-beam melting additive manufacturing, and printing parameters of the electron-beam melting additive manufacturing are: a powder preheating temperature of 900-1500° C., a scanning current of 5-15 mA, a scanning speed of $1.0*10^4$-$8.0*10^5$ mm/s, and a slice layer thickness of 20-50 μm.

* * * * *